United States Patent
Holler et al.

(10) Patent No.: US 9,465,635 B2
(45) Date of Patent: Oct. 11, 2016

(54) SYSTEM AND METHOD FOR MANAGING A VIRTUALIZED COMPUTING ENVIRONMENT

(71) Applicant: VMware, Inc., Palo Alto, CA (US)

(72) Inventors: Anne Marie Holler, Los Altos, CA (US); Ganesha Shanmuganathan, Santa Clara, CA (US); Chirag Bhatt, Sunnyvale, CA (US); Irfan Ahmad, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 199 days.

(21) Appl. No.: 14/493,182

(22) Filed: Sep. 22, 2014

(65) Prior Publication Data

US 2015/0106811 A1    Apr. 16, 2015

Related U.S. Application Data

(63) Continuation of application No. 13/115,836, filed on May 25, 2011, now Pat. No. 8,843,933.

(51) Int. Cl.
*G06F 9/46* (2006.01)
*G06F 9/455* (2006.01)
*G06F 9/50* (2006.01)

(52) U.S. Cl.
CPC ....... *G06F 9/45533* (2013.01); *G06F 9/45558* (2013.01); *G06F 9/5027* (2013.01); *G06F 9/5088* (2013.01); *G06F 2009/4557* (2013.01); *G06F 2209/5019* (2013.01)

(58) Field of Classification Search
None
See application file for complete search history.

(56) References Cited

U.S. PATENT DOCUMENTS

| | | |
|---|---|---|
| 2006/0218278 A1 | 9/2006 | Uyama et al. |
| 2006/0265713 A1 | 11/2006 | Depro et al. |
| 2007/0124109 A1 | 5/2007 | Timko et al. |
| 2008/0155208 A1 | 6/2008 | Hiltgen et al. |
| 2010/0191845 A1 | 7/2010 | Ginzton |
| 2011/0072138 A1 | 3/2011 | Canturk et al. |

OTHER PUBLICATIONS

VMware, Inc.; "Resource Management with VMware DRS"; pp. 1-24; Jun. 2006.
VMware, Inc.; "VMware Distributed Resource Scheduler (DRS): Dynamic Load Balancing and Resource Allocation for Virtual Machines"; pp. 1-3; 2009.
Holler, et al.; "DRS Performance and Power Play-Back"; in VMware Innovation Offsite 2007; Nov. 2007.
Ji, Minwen; "DRS Tech Talk"; Technical Report, VMware, Inc.; May 2006.
Laverick, Mike; "VMware vSphere 4 Implementation"; ISBN 978-0-07-166453-0, Ch. 13—VMware Distributed Resource Scheduler; pp. 395-422; Jan. 2010.
Wood, Timothy et al.; "Black-box and Gray-box Strategies for Virtual Machine Migration", NSDI 2007; USENIX Association, 4th USENIX Symposium on Network Systems Design & Implementation.

*Primary Examiner* — Emerson Puente
*Assistant Examiner* — Steven Do

(57) ABSTRACT

A technique for predictive distributed resource scheduling and distributed power management includes analyzing patterns in the workload, predicting future workloads, and making recommendations for changes to the virtual computing environment. In addition, a cost-benefit analysis can be performed to determine whether the recommended change would likely result in improved performance.

23 Claims, 8 Drawing Sheets

| t | Coding | | |
|---|---|---|---|
| 1 | 0 | -- | -- |
| 2 | 0 | 0 | -- |
| 3 | 0 | 0 | 0 |
| 4 | 0 | 0 | +1 |
| 5 | 0 | +1 | +1 |
| 6 | +1 | +1 | 0 |
| 7 | +1 | 0 | -1 |
| 8 | 0 | -1 | -1 |
| 9 | -1 | -1 | +5 |
| 10 | -1 | +5 | -4 |
| 11 | +5 | -4 | 0 |
| 12 | -4 | 0 | -1 |
| 13 | 0 | -1 | 0 |
| 14 | -1 | 0 | 0 |
| 15 | 0 | 0 | +1 |
| 16 | 0 | +1 | +1 |
| 17 | +1 | +1 | 0 |
| 18 | +1 | 0 | -1 |
| 19 | 0 | -1 | 0 |
| 20 | -1 | 0 | 0 |

FIG. 4C

SYSTEM AND METHOD FOR MANAGING A VIRTUALIZED COMPUTING ENVIRONMENT

CROSS-REFERENCE TO RELATED APPLICATION

This application is a Continuation of application Ser. No. 13/115,836, filed May 25, 2011, entitled "System and Method for Managing a Virtualized Computing Environment," entirety of which is incorporate by reference herein.

BACKGROUND

Virtualization management software enables multiple virtual machines to be executed on a single hardware computing platform and manages the allocation of computing resources to each virtual machine. A set of hardware computing platforms can be organized as a server cluster to provide computing resources for a data center. In addition, the virtualization management software can be configured to move virtual machines between servers (also referred to herein as "host systems" or "host computers") in the cluster. An example of this supporting technology is sold as VMware vMotion® by VMware, Inc. of Palo Alto, Calif. An example of the virtualization management software is sold as VMware Distributed Resource Scheduler™ by VMware, Inc. of Palo Alto, Calif.

A cluster resource management service for a virtualized computing environment handles the placement and scheduling of a set of virtual machines (VMs) on a set of hosts that each belong to a cluster, in accordance with a set of constraints and objectives. To address constraint violations and achieve objectives, the cluster resource management service generates and can automatically execute migrations of VMs between hosts and can recommend powering hosts on or off. For a VM to be powered-on on a host within a cluster, the cluster needs to have sufficient computing resources compatible with the VM's execution constraints to meet the VM's admission control requirements, and those resources must be available in unfragmented form, i.e., all on a single host in the cluster.

Conventional techniques for Distributed Resource Scheduling (DRS) and Distributed Power Management (DPM) operate in a reactive mode to demand changes, where VM migration and host power-ons and power-offs are recommended "reactively" based on current VM demand data. Reactive operation of DRS and DPM ensures that the recommendations are justified by relevant observed data, however, launching VM migrations and/or host power-ons and power-offs while VM demand is increasing can have a negative performance impact on VM workloads.

Accordingly, there remains a need in the art for a technique that addresses the drawbacks and limitations discussed above.

SUMMARY

One or more embodiments of the present invention provide a technique for predictive distributed resource scheduling and distributed power management. By analyzing the current workload, a virtual machine management center can predict future workloads and can make recommendations for changes to the virtual computing environment. In addition, a cost-benefit analysis can be performed to determine whether the recommended change would likely result in improved performance.

One embodiment provides a method for managing distributed computing resources in a virtual computing environment. The method includes receiving resource usage data of one or more virtual machines executing on a host computer; comparing the resource usage data to previously collected resource usage data of the one or more virtual machines; generating a prediction of future workload based on said comparing; and generating a resource allocation recommendation based on the prediction.

BRIEF DESCRIPTION OF THE DRAWINGS

FIG. 4C is a table that shows the relative coding of the quantized time series shown in FIG. 4B that takes three samples at each point, according to one embodiment of the invention.

DETAILED DESCRIPTION

Embodiments of the invention provide a technique for predictive distributed resource scheduling and distributed power management. By analyzing the current workload, a VM management center can predict future workloads and make recommendations for changes to the virtual computing architecture. In addition, a cost-benefit analysis can be performed to determine whether the recommended change would likely result in improved performance.

Hardware Overview

Figure 1A:
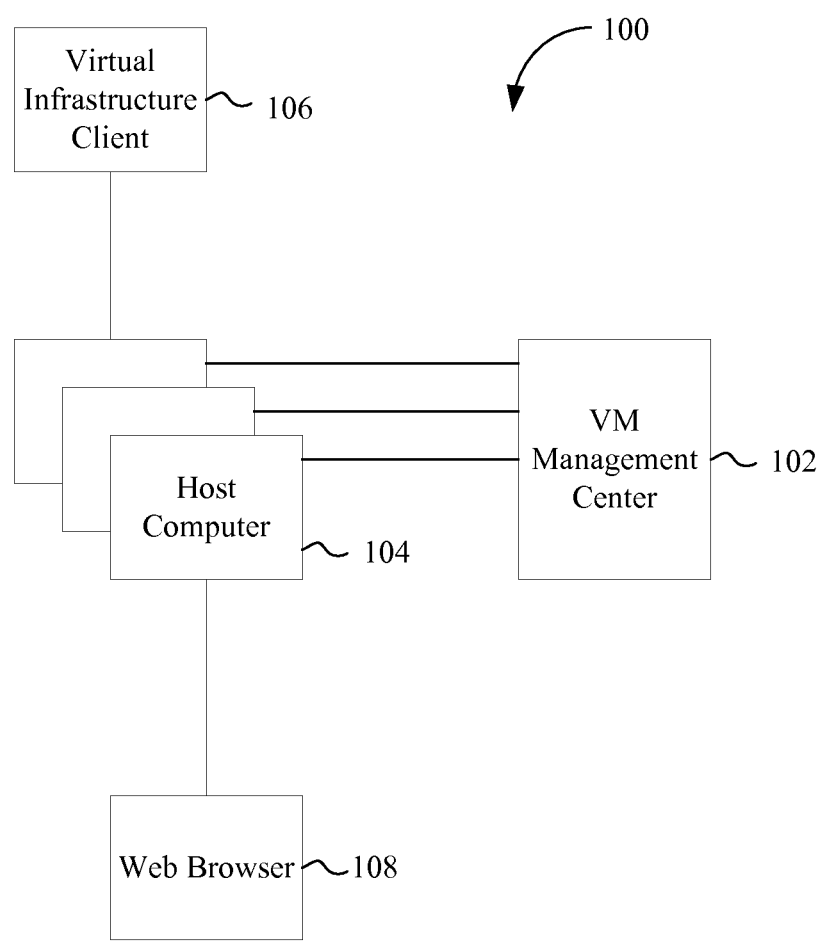
FIG. 1A depicts a block diagram of a virtualized computer system in which one or more embodiments of the present invention may be practiced.

FIG. 1A depicts a block diagram of a virtualized computer system 100 in which one or more embodiments of the present invention may be practiced. Host computers 104 (also referred to herein as "servers") are configured to deliver virtualization-based distributed services to information technology environments. Each host computer 104 provides a virtualization layer that abstracts processor, memory, storage, and/or networking resources into multiple virtual machines that run side-by-side on the same physical host computer 104. In one embodiment, virtualization software can be installed directly on the server hardware and inserts a virtualization layer between the hardware and the operating system. The virtualization software partitions a physical host computer 104 into multiple secure and portable virtual machines that run on the same physical server. Each virtual machine represents a complete system—with processors, memory, networking, storage, and/or BIOS.

A virtual machine (VM) management center 102 is also included in the system 100. The VM management center 102 manages the virtual infrastructure, including managing the host computers 104, the virtual machines running within each host computer 104, provisioning, migration, resource allocations, and so on.

According to various embodiments, implementing a virtualized system simplifies management with a client, such as the Virtual Infrastructure (VI) Client 106, that can be used to perform tasks. Each server configuration task, such as configuring storage and network connections or managing the service console, can be accomplished centrally through the VI Client 106. One embodiment provides a stand-alone application version of the VI Client 106. In another embodiment, a web browser application 108 provides virtual machine management access from any networked device. For example, with the browser version of the client 108, giving a user access to a virtual machine can be as simple as providing a URL (Uniform Resource Locator) to the user.

According to some embodiments, user access controls of the VM management center 102 provide customizable roles and permissions so an administrator can create roles for various users by selecting from an extensive list of permissions to grant to each role. Responsibilities for specific virtualized infrastructure components, such as resource pools, can be delegated based on business organization or ownership. VM management center 102 can also provide full audit tracking to provide a detailed record of every action and operation performed on the virtual infrastructure.

Figure 1B:
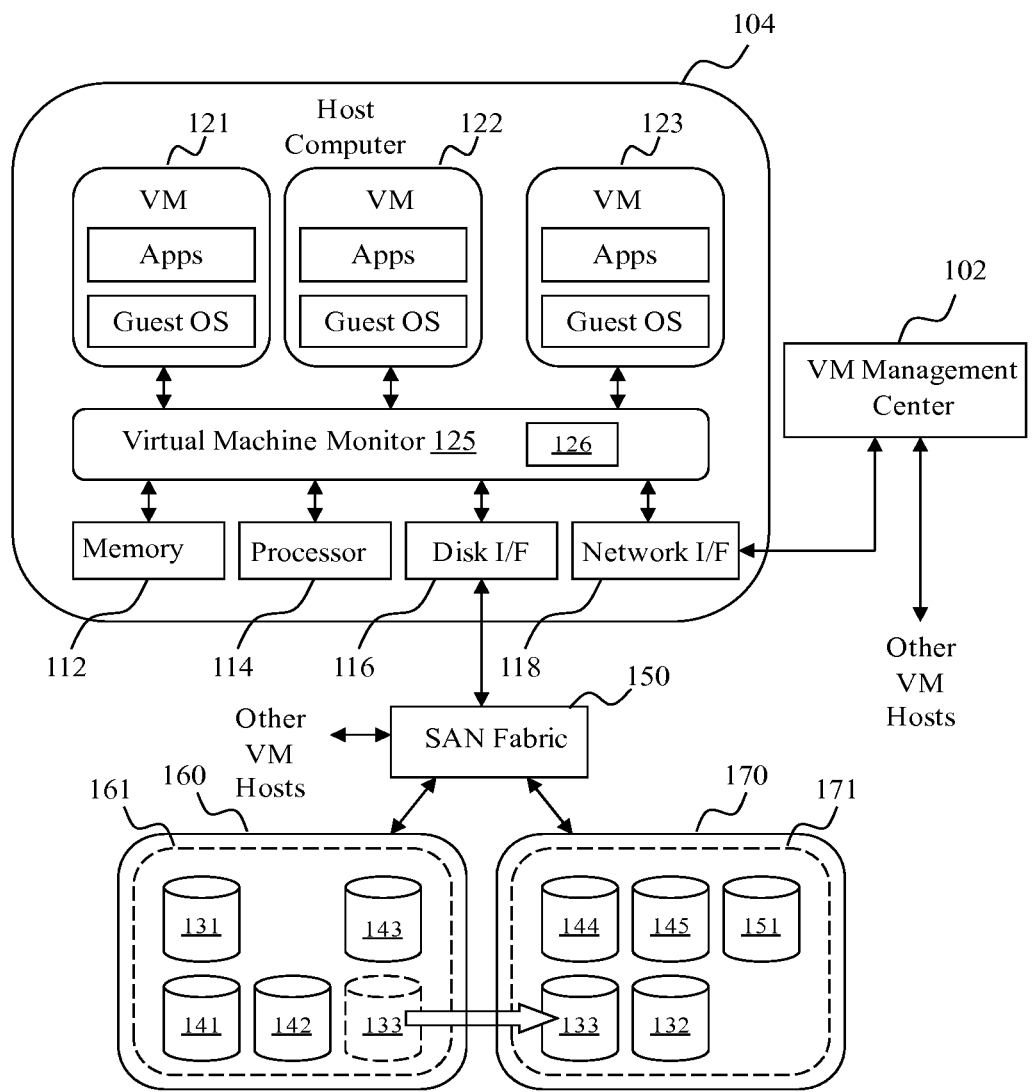
FIG. 1B depicts a block diagram of a host computer and virtual machine (VM) management center, according to one embodiment of the invention.

FIG. 1B depicts a block diagram of a host computer 104 and VM management center 102, according to one embodiment of the invention. A virtualized environment includes a host computer 104 that has conventional components of a computing device, and may be implemented within a cluster of computing devices. One or more virtual machines are configured within the host computer 104, represented in FIG. 1B as VM 121, VM 122, and VM 123, that share hardware resources of host computer 104, such as system memory 112, processor 114, disk interface 116, and network interface 118. Examples of disk interface 116 are a host bus adapter and a network file system interface. An example of network interface 118 is a network adapter.

The virtual machines VM 121-123 run on top of a virtual machine monitor 125, which is a software interface layer that enables sharing of the hardware resources of host computer 104 by the virtual machines. Virtual machine monitor 125 may run on top of the operating system of the host computer 104 or directly on hardware components of the host computer 104. In some embodiments, virtual machine monitor 125 runs on top of a hypervisor that is installed on top of the hardware resources of host computer 104. Together, the virtual machines 121-123 and virtual machine monitor 125 create virtualized computer systems that give the appearance of being distinct from host computer 104 and from each other. Each virtual machine includes a guest operating system and one or more guest applications. The guest operating system is a master control program of the virtual machine and, among other things, the guest operating system forms a software platform on top of which the guest applications run.

In one embodiment, data storage for host computer 104 is served by a storage area network (SAN), which includes a storage array 160 (e.g., a disk array), a storage array 170 (e.g., a disk array), and a switch (SAN fabric) 150 that connects host computer 104 to storage array 160 and storage array 170. Switch 150, illustrated in the embodiment of FIG. 1B, is a SAN fabric switch, but other types of switches may be used. As illustrated, switch 150 is further connected to virtual machine host computers, other than host computer 104, whose files are also stored in storage array 160, and storage array 170. Typically, storage array 160 and storage array 170 are exposed to the host computers as logical unit numbers (LUNs), and there is a mapping between each LUN and physical devices, such as disk drives, in the storage arrays. In certain embodiments disclosed herein, it is assumed that there is a one-to-one correspondence between the LUNs and the storage arrays, such that storage array 160 is LUN 161 and storage array 170 is LUN 171. However, embodiments of the invention are applicable to storage array configurations where the correspondence between the LUNs and the storage arrays is not one-to-one. Distributed storage systems other than SAN systems may also be used. For example, a network attached storage (NAS) system configured to expose a file system volume to clients may also be used.

In the embodiment illustrated in FIG. 1B, LUN 161 includes disk images of four virtual machines and LUN 171 includes disk images of five virtual machines. VM 121 running in host computer 104 has a disk image 131 stored in LUN 161, and VM 122 running in host computer 104 has a disk image 132 stored in LUN 171. Disk image 133, which is the disk image corresponding to VM 123 running in host computer 104, is illustrated in dashed lines because it has been migrated to LUN 171. Disk images 141, 142, 143, 144, 145, 151 are disk images of virtual machines running in other virtual machine host computers. Disk images 141, 142, 143 are stored in LUN 161, and disk images 144, 145, 151 are stored in LUN 171.

A software component 126 is implemented inside virtual machine monitor 125 to monitor input-output operations (I/Os) of the virtual machines. Alternatively, software component 126 may be implemented in the file system layer of the hypervisor. One example of software component 126 is the vscsiStats utility that is available from VMware Inc. Software component 126 generates histograms for the following parameters: (1) seek distance or randomness, which is a measure of the spatial locality in the workload measured as the minimum distance in terms of sectors or logical block numbers from among the last k number of I/Os, a small distance signifying high locality; (2) I/O data length, represented in different bins of size 512 Bytes, 1 KB, 2 KB, etc.; (3) outstanding I/Os, denoting the queue length that virtual machine monitor 125 sees from a virtual machine; (4) I/O rate; (5) I/O latency, which is measured for each IO from the time it gets issued by the virtual machine until the virtual machine is interrupted for its completion; and (6) read/write ratio, which is a measure of number of read requests in relation to write requests. The histograms may be collected on a per virtual machine basis, a per virtual-disk basis (e.g., in cases where a single VM has multiple virtual disks), or any other technically feasible basis.

In virtualized computer systems, in which disk images of virtual machines are stored in the storage arrays, disk images of virtual machines can be migrated between storage arrays as a way to balance the loads across the storage arrays. For example, the Storage vMotion® product that is available from VMware Inc. of Palo Alto, Calif. allows disk images of virtual machines to be migrated between storage arrays without interrupting the virtual machine whose disk image is being migrated or any applications running inside it.

A distributed storage system employs multiple storage arrays and serves multiple client computers over a network. In such a system, loads on the storage arrays can vary as demands from the client computers fluctuate. To optimize performance of the storage arrays, loads on the multiple storage arrays are observed and balanced when they become uneven.

In other embodiments, any technically feasible data storage implementation, other than a SAN, can be used to provide storage resources for host computer 104.

As described, disk images of virtual machines can be migrated between storage arrays as a way to balance the loads across the storage arrays. Similarly, VMs can be migrated between different host computers.

Figure 2A:
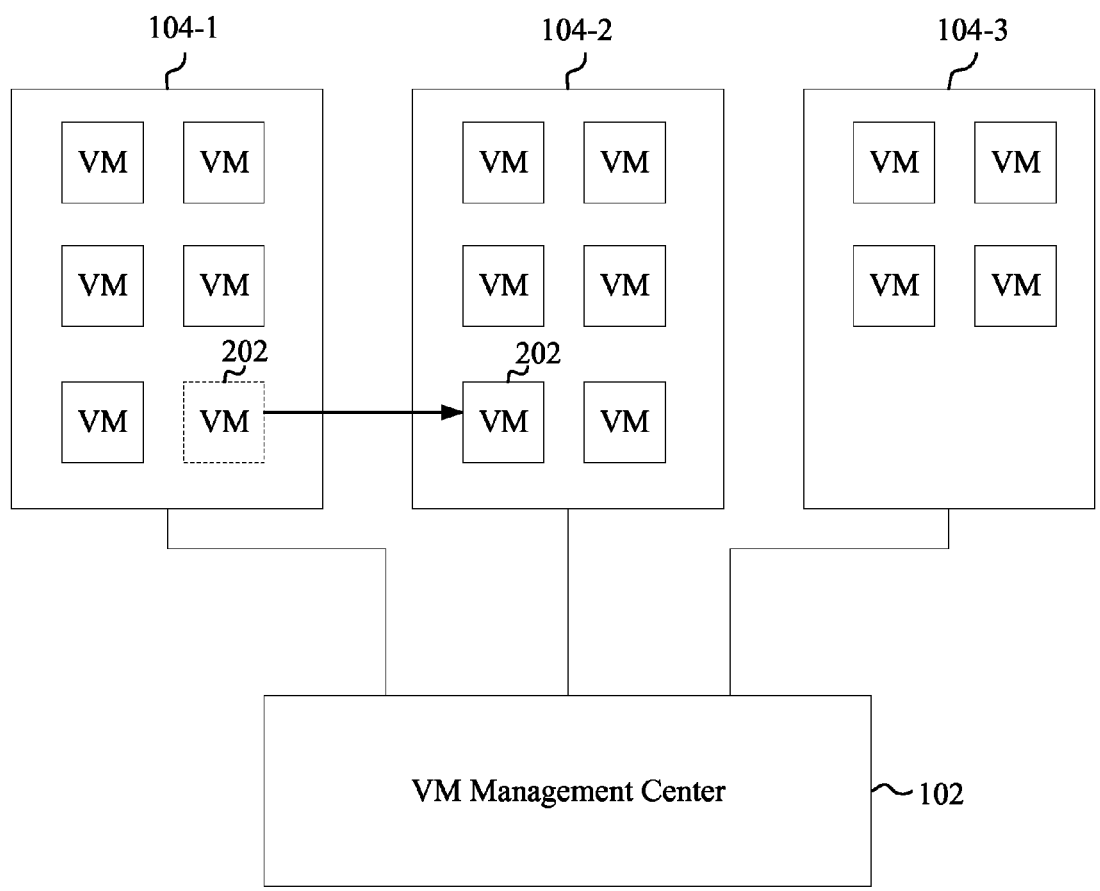
FIG. 2A illustrates migrating a VM from a first host computer to a second host computer, according to one embodiment of the invention.

FIG. 2A illustrates migrating a virtual machine (VM) from a first host computer to a second host computer, according to one embodiment of the invention. A Distributed Resource Scheduling (DRS) module within the VM management center 102 provides the ability to view and manage the resources in the virtual computing environment. A global scheduler within VM management center 102 enables resource allocation and monitoring for the virtual machines running on host computers, such as host computers 104-1, 104-2, 104-3, that form the virtual environment.

In some embodiments, the DRS module provides automatic initial virtual machine placement on any of the host computers, and also makes automatic resource relocation and optimization decisions as hosts or virtual machines are added or removed from the virtual environment. The DRS module can also be configured for manual control, in which case the DRS module makes recommendations that a user or administrator who can review and carry out the changes manually. As shown in example in FIG. 2A, the VM management center 102 has determines that VM 202 should migrate from host computer 104-1 to host computer 104-2.

Figure 2B:
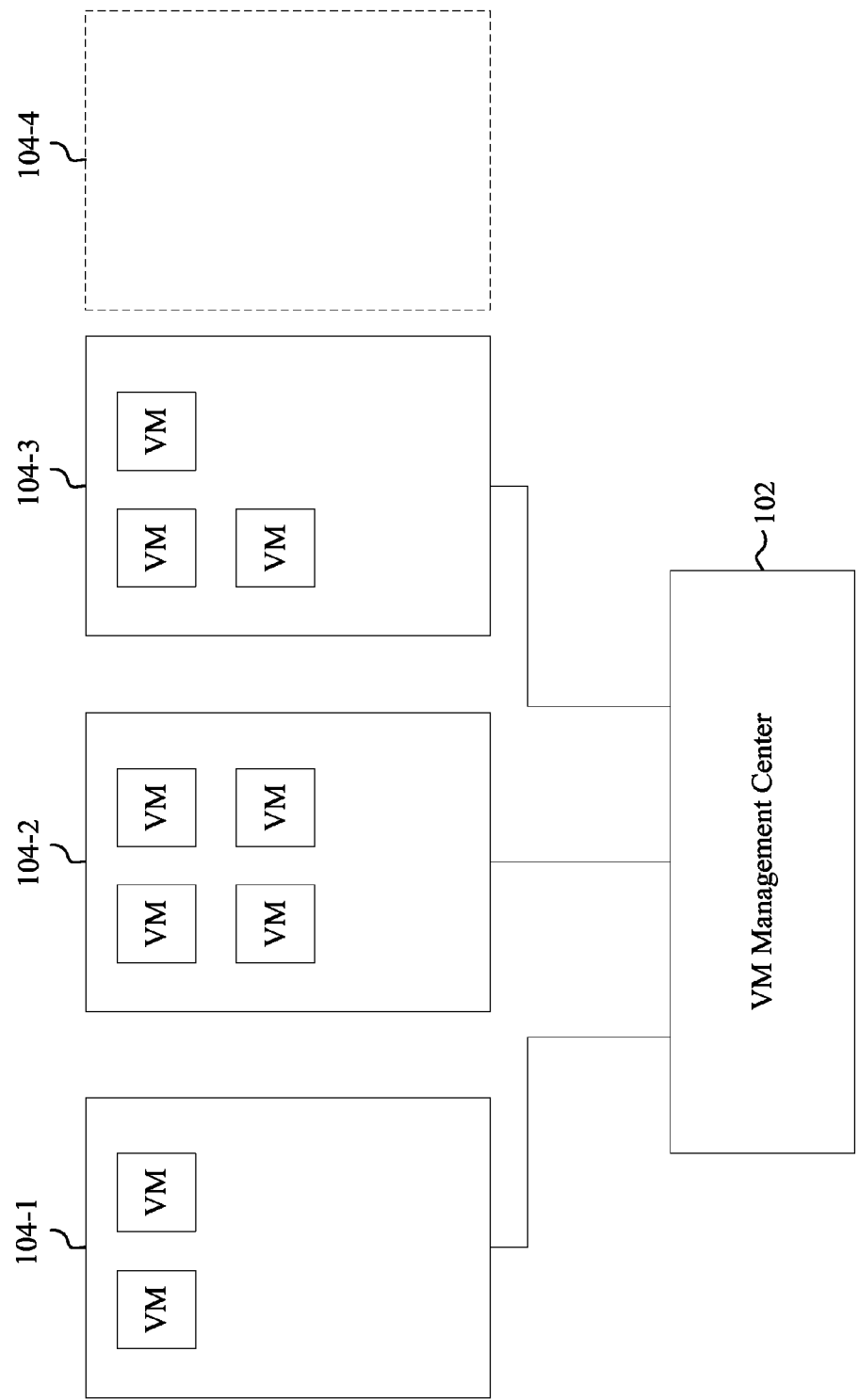
FIG. 2B illustrates powering on a host computer in a virtualized environment, according to one embodiment of the invention.

FIG. 2B illustrates powering on a host computer in a virtualized environment, according to one embodiment of the invention. In a similar vein to migrating disk images of virtual machines between storage arrays and migrating VMs between host computers, the VM management center 102 may also determine that certain host computers should be powered on or off based on the workload in the virtual computing environment. As shown, one or more VMs can be executing on each of host computers 104-1, 104-2, 104-3. Another host computer 104-4 can be included in the virtual computing environment, but may be powered off to converse power when the resources of the host computer 104-4 are not needed to support the VMs. The VM management center 102 can monitor the activity of the virtual computing environment and can cause the host computer 104-4 to be powered on when needed. Then, one or more VMs running on the host computers 104-1, 104-2, 104-3 can be migrated to the newly powered-on host computer 104-4.

Predictive DRS and DPM Based on Pattern Matching

Embodiments of the invention provide techniques for predictive distributed resource scheduling (DRS) and distributed power management (DPM). In some embodiments, performing disk image migrations, VM migrations, and/or host power-ons before the currently available host resources become constrained can allow these processes to be completed more quickly with less resource contention. This can be particularly valuable when the VMs to be moved have large memory footprints. In addition, starting host power-ons before the associated host capacity is needed can hide the latency associated with the additional capacity becoming available.

One embodiment of the invention provides a pattern matching predictor for predictive DRS and DPM. The goal of the pattern matching predictor is to match relative patterns in the workload and predict whether the current pattern matches a pattern that the predictor has identified in the past. If a match is found, then recommendations associated with resource usage can be made.

Figure 3:
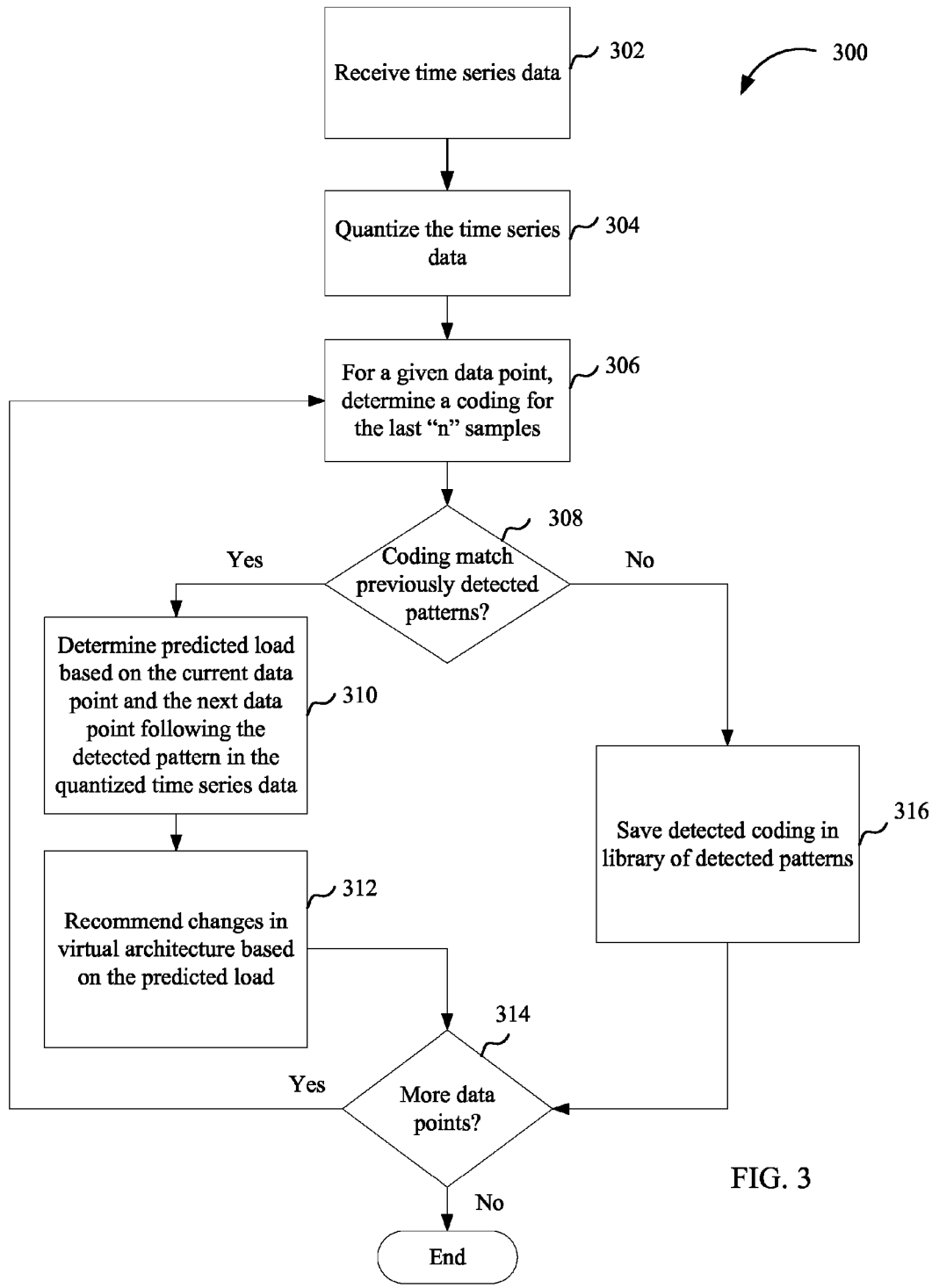
FIG. 3 is a flow diagram of method steps for implementing a pattern matching predictor, according to one embodiment of the invention.

FIG. 3 is a flow diagram of method steps for implementing a pattern matching predictor, according to one embodiment of the invention. Persons skilled in the art would understand that, even though the method 300 is described in conjunction with the systems of FIG. 1A-2B, any system configured to perform the method steps, in any order, is within the scope of embodiments of the invention.

As shown, the method 300 begins at step 302, where a VM management center receives time series data associated with a workload of the virtualized computing environment. The time series data may be associated with processor utilization, memory utilization, disk I/Os, network utilization, or any other metric. According to various embodiments, the time series data can be associated with each VM or with each host computer. In some embodiments, the time series data can be collected at varying intervals depending on the activity in the DRS cluster (resource setting or cluster configuration changes) that may trigger the DRS algorithm to be run.

At step 304, the VM management center quantizes the time series data. Quantizing the time series data may include applying a filter to the data to smooth out the peaks and valleys in the data. Accordingly, the noise and small fluctuations are ignored. In one embodiment, the range between maximum and minimum demand values is divided into k bins, e.g., k=16 bins. The time series data is then quantized and each value in the time series is mapped into one of the k bins. After quantizing the work load, the small variations are smoothed out and only the higher level pattern remains.

Figure 4A:
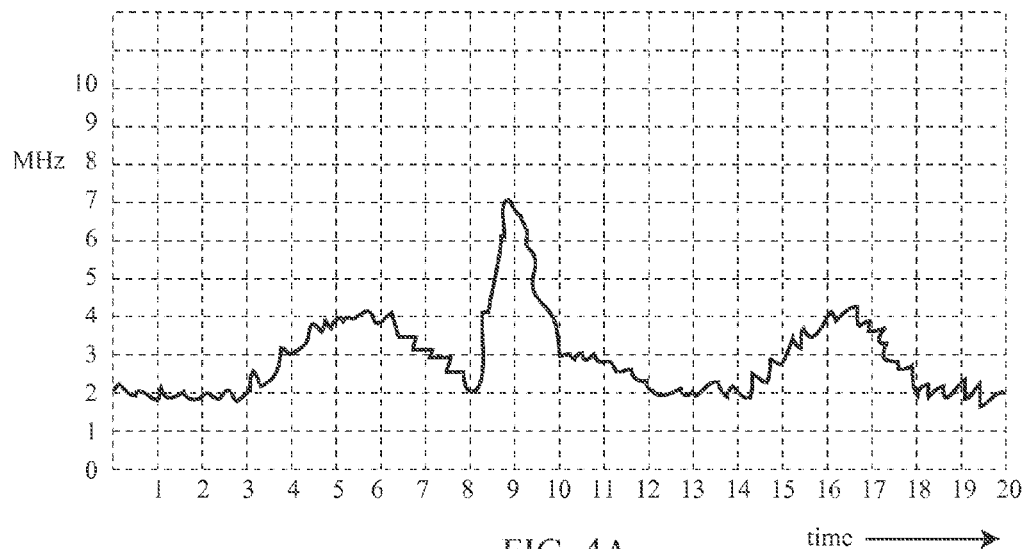
FIG. 4A is a conceptual diagram illustrating time series data, according to one embodiment of the invention.
Figure 4B:
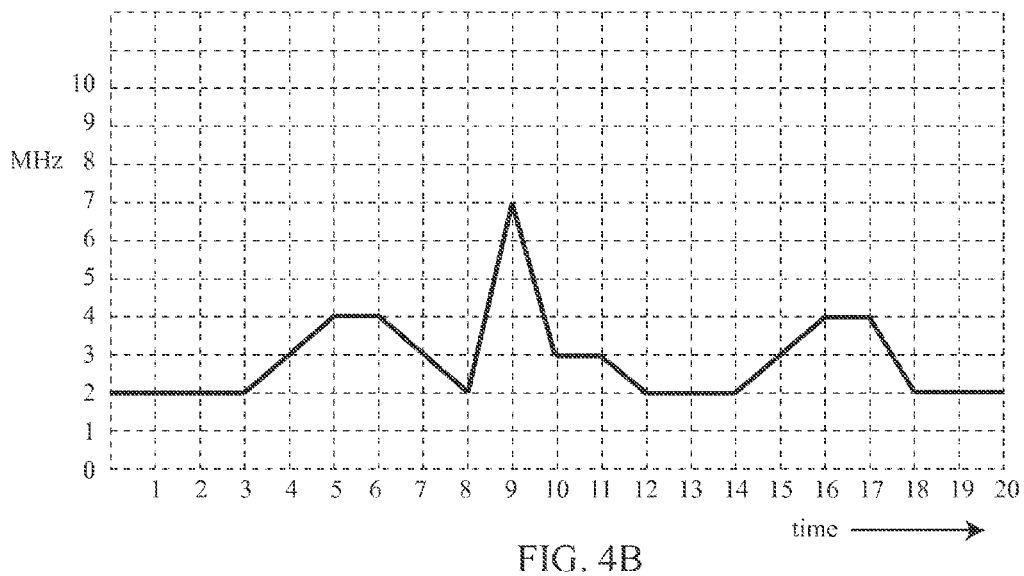
FIG. 4B is a conceptual diagram illustrating quantized time series data, according to one embodiment of the invention.

FIG. 4A is a conceptual diagram illustrating time series data, according to one embodiment of the invention. In the example shown, processor utilization is shown in MHz and is plotted against time. FIG. 4B is a conceptual diagram illustrating quantized time series data, according to one embodiment of the invention. As shown, the time series data is quantized into integer buckets to remove small fluctuations in the data. The quantized time series data can then be used to detect patterns in the load.

Referring back to FIG. 3, at step 306, the VM management center determines a coding of the last n samples for a given data point in the quantized time series. In one example, n is equal to 3, and the VM management center determines a coding of the last 3 samples in the quantized time series. In the example shown in FIG. 4B, the coding of the last 3 samples at time t=5 is "4, 3, 2," which corresponds to the quantized values of the processor utilization at times t=4, t=3, and t=2. However, implementing the pattern matching technique with absolute values of the quantized time series can lead to the pattern matching predictor to miss patterns that are shifted up or down. For example, there might be a pattern where the load goes from 2 to 4 and then back to 2. The coding for this pattern would be "2, 4, 2." A similar pattern "3, 5, 3" may occur at a later time, but this pattern would be considered different. To avoid missing similar patterns that have been shifted up or down, the quantized load values are converted into relative values such as 0, +1, −1. Now the 2, 4, 2 pattern and the 3, 5, 3 pattern have the same relative coding, which is 0, +2, −2. The relative coding is calculated as the difference between the load value at time t and time t−1. For example, the relative coding for the data point at time t=9 is "+5," i.e., 7−2=+5.

FIG. 4C is a table that shows the relative coding of the quantized time series shown in FIG. 4B using three samples at each point, according to one embodiment of the invention. As the VM management center analyzes the quantized time series that it receives, the VM management center may be configured to detect the relative coding for n number of time samples for a given data point. The relative coding can be stored in a memory along with the relative load at the next time point. For example, with n=3, the relative coding at time t=5 is "0, +1, +1" and the relative load that the next time point, i.e., at time t=6, is "0."

At step 308, the VM management center determines whether the coding for a current time point matches a previously detected coding. The pattern matching may be implemented similar to string pattern matching. In some embodiments, the algorithm has a maximum length of the pattern that is searched, Lmax, and the minimum length of the pattern that is searched, Lmin. Patterns of length Lmax, Lmax−1 . . . Lmin can be searched. For a particular time t, and for a given pattern length l, the last l−1 values (t−1, t−2 . . . t−l−1) are considered as a pattern. The pattern history includes the previous workload values in the relative quantized form for the last m minutes. In one example, m is on the order of 5000 minutes. In the range 0 to t−l, the pattern is searched for. Longer patterns are searched before searching for shorter patterns as we want to find the longest pattern match. If a pattern of length Lmax is not found then a pattern of Lmax−1 is searched for. In one embodiment, Lmax=Lmin, and, accordingly, patterns only a single length are searched for.

If a pattern match is found, then the method 300 proceeds to step 310. At step 310, the VM management center determines a predicted load based on the current load data point and the next data point following the detected pattern in the quantized time series data. For example, assume the next relative quantized value is +2 and the last value is 30. Then 30 is converted into a quantized value, say 5, and the next relative quantized value +2 is added to 5, producing a bucket of 7. The quantized value 7 is then converted into absolute value by finding the maximum possible value for bucket 7. Some embodiments take the maximum possible value for the bucket in an effort to make a conservative prediction that tracks the demand as closely as possible while predicting a value that is equal to or greater than the demand. In some embodiments, it is preferable to cover the actual peaks, and the prediction is still useful even when there is an overshoot.

At step 312, the VM management center recommends changes in the virtual computing environment based on the predicted load. As described, the recommendation may include migrating a VM from one host computer to another host computer, host computer power-on and power-offs, migrations of disk images, or any other technically feasible virtual computing environment management recommendation. In some embodiments, the recommendations are automatically carried out by the virtual computing environment. In other embodiments, the recommendations are provided to a user or administrator that approves the recommendations and allows the changes to be performed. Some embodiments of the invention include performing a cost-benefit analysis to determine whether the recommendations suggested by the VM management center should be performed, as described below in FIG. 5.

At step 314, the VM management center determines whether additional data points are received. If additional data points are received, then the method 300 returns to step 306, described above. If no additional data points are received, then the method 300 terminates.

Referring back to step 308, if the VM management center determines that the coding for a current time point does not match a previously detected coding, then the method 300 proceeds to step 316. At step 316, the VM management center saves the detected coding in a library of detected patterns. The detected coding is used in subsequent comparisons made at step 308 for future data points. In this manner, the pattern matching technique is dynamic in that it is continuously learning and updating the patterns that are recognized. In embodiments where patterns of multiple lengths are searched for, more than one pattern may be stored in the library of detected patterns at step 316.

In some embodiments, when no pattern match is found, the moving average of last x samples is predicted as the next value. The value of x can be equal to n or can be any other number of samples.

As described in FIG. 3, a pattern matching predictor can be used to predict future load and make recommendations about the virtual computing environment. In another embodiment, a "polyfit" prediction mechanism can be used instead. In that embodiment, the goal of the prediction is to utilize the local trends to predict where the load is going. The predictor takes the last n points and draws a curve that best fits the points. The curve is then extended to find the next point in time. The predictor can use a polynomial curve fitting algorithm that finds the coefficients of a second degree polynomial equation. From this equation, the next point for the future time is calculated.

In yet another embodiment, a "simple step prediction" mechanism can be used. In this embodiment, the predictor assumes a simple step pattern in the workload and finds the inter peak distances and also determines how long the peak lasts. Based on these two characteristics, the predictor predicts the height of the next peak and how long the peak will last. The predictor looks at the last m minutes and finds the mean inter peak distance. The start of the peak is defined as when the current point in the load is above the x percentile based on the last m minutes. The end of the peak is when the load is no longer in the x percentile. The predictor keeps track of the mean inter peak distance, average duration of peaks (how long does the peak last) and the value of the peak. The predictor also sees when the last peak occurred and whether a peak is happening currently. For example, assume the last peak happened at t−6 and the average peak length is 7. Then, the predictor will predict a peak for the next average peak duration time. The height of the peak is currently the maximum peak the predictor has seen in the last m minutes.

According to various embodiments, the VM management center is configured to transmit the recommendation for resource allocation to the DRS module, the DPM module, and/or to one or more host computers. For example, recommendation could be transmitted to a resource scheduler within a host computer. In some embodiments, the process for generating moves to address cluster imbalance is as follows. The cluster capacity is divided among the VMs and resource pools in the cluster and each VM's dynamic entitlement is computed. A VM's dynamic entitlement incorporates its static entitlement (based on its shares, reservation, and limit) and its demand (plus some headroom). "Shares" define the relative priority or importance of a virtual machine, "reservation" defines the guaranteed resources for the virtual machine, and "limit" defines the upper limit for resource utilization for a virtual machine. Then, each host's imbalance metric is computed as the sum of the entitlements of the VMs on the host divided by the host capacity. The standard deviation of this metric is computed across the hosts, and if it is greater than a user-configurable threshold, DRS considers load-balancing moves between hosts. In considering load-balancing moves, each move is scored based on its improvement in the cluster imbalance metric and on its risk-adjusted costs and benefits. The move with the best score is selected, and the standard deviation of the host imbalance metric is recomputed incorporating that move. The DRS/DPM module continues to consider load-balancing moves while the value is greater than the threshold. In some embodiments, the recommendation is based on the shares, reservation, and/or limit of one or more virtual machines. Accordingly, if the shares, reservation, and/or limit of one of the VMs is modified, then the recommendation could be different.

Figure 5:
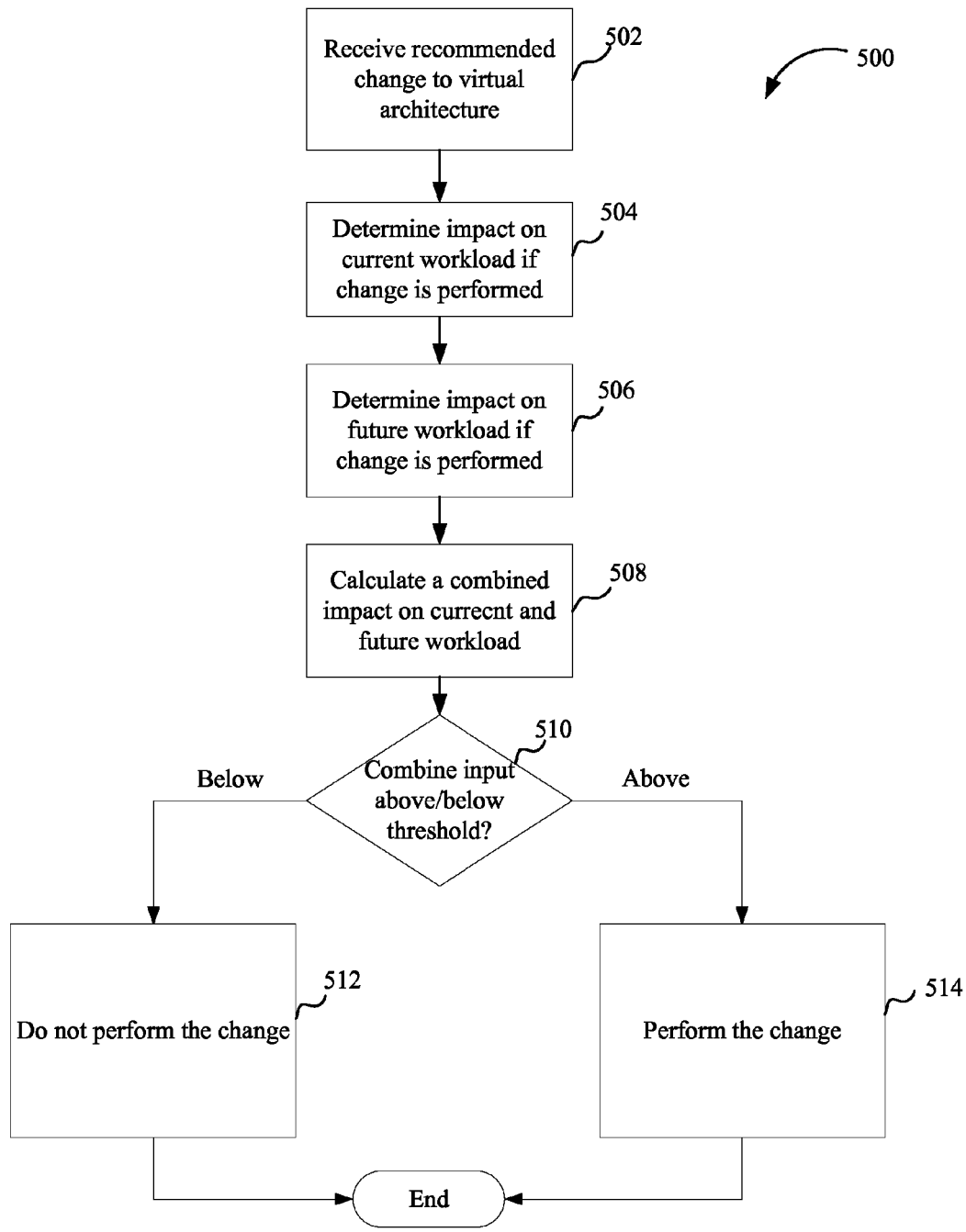
FIG. 5 is a flow diagram of method steps for performing a cost-benefit analysis to determine whether recommendations suggested by the VM management center should be performed, according to one embodiment of the invention.

FIG. 5 is a flow diagram of method steps for performing a cost-benefit analysis to determine whether recommendations suggested by the VM management center should be performed, according to one embodiment of the invention. Persons skilled in the art would understand that, even though the method 500 is described in conjunction with the systems of FIGS. 1A-2B and 4A-4C, any system configured to perform the method steps, in any order, is within the scope of embodiments of the invention.

As shown, the method 500 begins at step 502, where a DRS module receives a recommended change to the virtual computing architecture. In one embodiment, the recommended change may be based on performing predictive pattern matching analysis, as described in FIG. 3.

At step 504, the DRS module determines an impact on the current workload if the change is performed. Since the current workload is known, the impact on the current workload if the change is performed can be calculated relatively accurately. At step 506, the DRS module determines an impact on future workload if the change is performed. Since future workload is based on a prediction, the impact on future workload if the change is performed can be weighted by a confidence in the future prediction.

At step 508, the DRS module calculates a combined impact on current and future workload. At step 510, the DRS module determines whether the combined impact on current and future workload is above or below a threshold. In some embodiments, moves that hurt both current and future cluster imbalance are rejected. Moves that improve both current and future cluster imbalance are scored as the sum of current and future improvement, weighted by confidence in the future prediction of VMs on the source and target hosts. Moves that improve current, but hurt future cluster imbalance, could be scored as the improvement in current imbalance, with the idea that cost-benefit analysis will likely reject this move. Moves that hurt current but improve future cluster imbalance are challenging to analyze; these moves need to be considered in light of how much benefit may be derived in the future (along with the confidence in the future) versus how much impact there is on current cluster imbalance.

If, at step 510, the DRS module determines that the combined impact on current and future workload is below the threshold, then the method 500 proceeds to step 512. At step 512, the DRS module does implement the recommended change and the virtual architecture continues to operate in the current mode.

If, at step 510, the DRS module determines that the combined impact on current and future workload is above the threshold, then the method 500 proceeds to step 514. At step 514, the DRS module causes the recommended change to be performed to the virtual computing architecture.

In sum, embodiments of the invention provide a technique for predictive distributed resource scheduling and distributed power management. By analyzing the current workload, a VM management center can predict future workloads and make recommendations for changes to the virtual computing architecture. In addition, a cost-benefit analysis can be performed to determine whether the recommended change would likely result in improved performance.

Advantageously, performing VM and/or disk image migrations before available host resources become constrained can allow the migrations to complete more quickly with less resource contention. This can be particularly valuable when the VMs to be moved have large memory footprints. In addition, starting host power-ons before the associated host capacity is needed can hide the latency associated with that capacity becoming available, providing improved performance.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing distributed computing resources in a virtual computing environment, comprising:
    receiving resource usage data of one or more virtual machines executing on a host computer;
    comparing the resource usage data to previously collected resource usage data of the one or more virtual machines;
    generating a prediction of future workload based on said comparing;
    generating a resource allocation recommendation based on the prediction; and
    allocating resources according to the resource allocation recommendation;
    wherein generating a prediction of future workload based on said comparing further comprises:
        assuming a step pattern in the resource usage data;
        finding inter peak distances in the step pattern of the resource usage data;
        finding how long peaks in the step pattern of the resource data last; and
        predicting future workloads based on the inter peak distances in the step pattern of the resource usage data and based on how long the peaks in the step pattern of the resource usage data last.

2. A non-transitory computer-readable storage medium comprising instructions that, when executed in a computing device, causes the computing device to carry out the steps of:
    receiving resource usage data of one or more virtual machines executing on a host computer;
    comparing the resource usage data to previously collected resource usage data of the one or more virtual machines;
    generating a prediction of future workload based on said comparing;
    generating a resource allocation recommendation based on the prediction; and
    allocating resources according to the resource allocation recommendation;
    wherein generating a prediction of future workload based on said comparing further comprises:
        assuming a step pattern in the resource usage data;
        finding inter peak distances in the step pattern of the resource usage data;
        finding how long peaks in the step pattern of the resource data last; and
        predicting future workloads based on the inter peak distances in the step pattern of the resource usage data and based on how long the peaks in the step pattern of the resource usage data last.

3. A computer system, comprising:
    one or more host computers; and
    a virtual management computer, configured to:
        receive resource usage data of one or more virtual machines executing on the one or more host computers,
        compare the resource usage data to previously collected resource usage data of the one or more virtual machines,
        generate a prediction of future workload based on said comparing,
        generate a resource allocation recommendation based on the prediction; and
        allocate resources according to the resource allocation recommendation;
        wherein generating a prediction of future workload based on said comparing further comprises:
            assuming a step pattern in the resource usage data;
            finding inter peak distances in the step pattern of the resource usage data;
            finding how long peaks in the step pattern of the resource data last; and
            predicting future workloads based on the inter peak distances in the step pattern of the resource usage data and based on how long the peaks in the step pattern of the resource usage data last.

4. The method of claim 3, further comprising transmitting the resource allocation recommendation to a resource scheduler configured to cause the virtual machine to migrate from the first host computer to the second host computer.

5. The method of claim 1, wherein the resource allocation recommendation comprises a recommendation to migrate a disk image of a virtual machine from a first storage array to a second storage array.

6. The method of claim 1, wherein the resource allocation recommendation comprises a recommendation to power on or power off a host computer.

7. The method of claim 6, further comprising transmitting the resource allocation recommendation to a power management module configured to cause host computer to be powered on or powered off.

8. The method of claim 1, wherein the resource allocation recommendation is based on an entitlement, including shares, reservation, and/or limit, of one or more virtual machines, wherein modifying the entitlement causes a different resource allocation recommendation to be generated.

9. A non-transitory computer-readable storage medium comprising instructions that, when executed in a computing device, causes the computing device to carry out the steps of:
receiving resource usage data of one or more virtual machines executing on a host computer;
comparing the resource usage data to previously collected resource usage data of the one or more virtual machines;
generating a prediction of future workload based on said comparing; and
generating a resource allocation recommendation based on the prediction;
wherein generating a prediction of future workload based on said comparing further comprises:
assuming a step pattern in the resource usage data;
finding inter peak distances in the step pattern of the resource usage data;
finding how long peaks in the step pattern of the resource data last; and
predicting future workloads based on the inter peak distances in the step pattern of the resource usage data and based on how long the peaks in the step pattern of the resource usage data last.

10. The computer-readable storage medium of claim 9, further comprising:
filtering the data to generate quantized data; and
determining a coding for the resource allocation based on the quantized data, wherein generating the prediction of future workload is based on determining whether the coding matches a previously detected workload pattern.

11. The computer-readable storage medium of claim 9, wherein the resource allocation recommendation comprises a recommendation to migrate a virtual machine from a first host computer to a second host computer.

12. The computer-readable storage medium of claim 11, further comprising transmitting the resource allocation recommendation to a resource scheduler configured to cause the virtual machine to migrate from the first host computer to the second host computer.

13. The computer-readable storage medium of claim 9, wherein the resource allocation recommendation comprises a recommendation to migrate a disk image of a virtual machine from a first storage array to a second storage array.

14. The computer-readable storage medium of claim 9, wherein the resource allocation recommendation comprises a recommendation to power on or power off a host computer.

15. The computer-readable storage medium of claim 14, further comprising transmitting the resource allocation recommendation to a power management module configured to cause host computer to be powered on or power off.

16. The computer-readable storage medium of claim 9, wherein the resource allocation recommendation is based on an entitlement, including shares, reservation, and/or limit, of one or more virtual machines, wherein modifying the entitlement causes a different resource allocation recommendation to be generated.

17. A computer system, comprising:
one or more host computers; and
a virtual management computer, configured to:
receive resource usage data of one or more virtual machines executing on the one or more host computers,
compare the resource usage data to previously collected resource usage data of the one or more virtual machines,
generate a prediction of future workload based on said comparing, and
generate a resource allocation recommendation based on the prediction;
wherein generating a prediction of future workload based on said comparing further comprises:
assuming a step pattern in the resource usage data;
finding inter peak distances in the step pattern of the resource usage data;
finding how long peaks in the step pattern of the resource data last; and
predicting future workloads based on the inter peak distances in the step pattern of the resource usage data and based on how long the peaks in the step pattern of the resource usage data last.

18. The computer system of claim 17, wherein the virtual management computer is further configured to:
filter the data to generate quantized data; and
determine a coding for the resource allocation based on the quantized data, wherein generating the prediction of future workload is based on determining whether the coding matches a previously detected workload pattern.

19. The computer system of claim 17, wherein the resource allocation recommendation comprises a recommendation to migrate a virtual machine from a first host computer to a second host computer.

20. The computer system of claim 19, wherein the virtual management computer is further configured to transmit the resource allocation recommendation to a resource scheduler included in the first host computer configured to cause the virtual machine to migrate from the first host computer to the second host computer.

21. The method of claim 1, wherein the start of a peak is defined as when the current point in the workload is above x percentile based on the last m minutes and the end of the peak is when the workload is no longer in the x percentile.

22. The method of claim 21, further comprising keeping track of the mean inter peak distance, average duration of peaks, and the value of the peaks and determining when the last peak occurred.

23. The method of claim 21, further comprising keeping track of the mean inter peak distance, average duration of peaks, and the value of the peaks and determining whether a peak is currently happening.

* * * * *